UNITED STATES PATENT OFFICE 2,609,532

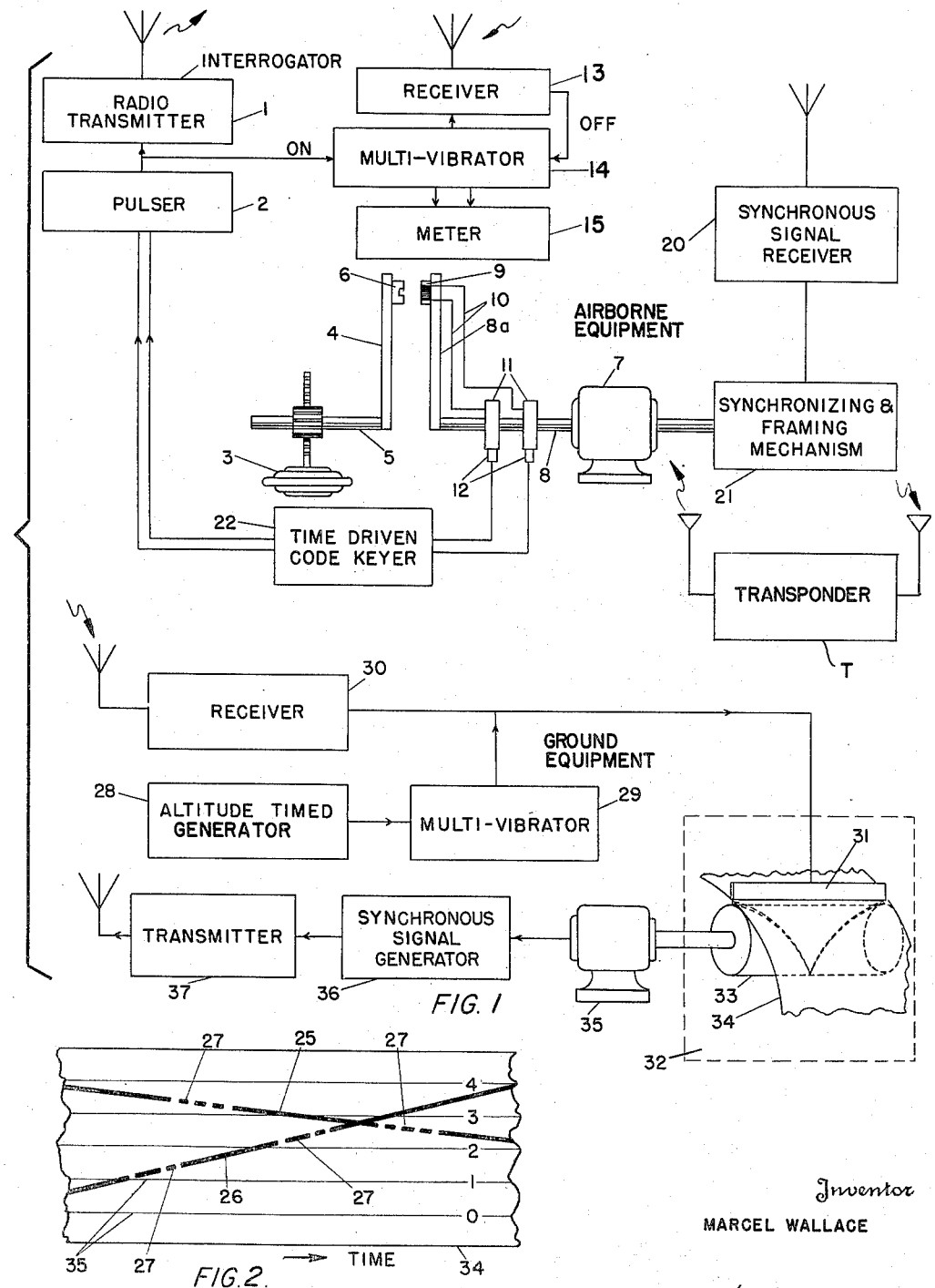

ALTITUDE AND DISTANCE RECORDER

Marcel Wallace, East Port Chester, Conn., assignor, by mesne assignments, of one-half to said Wallace, doing business as Panoramic Laboratories, East Port Chester, Conn.

Application June 16, 1947, Serial No. 754,941

15 Claims. (Cl. 343—7)

This application is a continuation-in-part of applications for U. S. Patent #633,138, filed in the names of Wallace and Wu on December 6, 1945, now Patent #2,505,314, and of an application for Telemetric Pulse Time Position Recorder, filed in the name of M. Wallace on April 25, 1947, and identifiable as Serial Number 743,939, now Patent #2,534,841.

The present invention relates generally to improvements in distance measuring equipment and more particularly to systems and methods for modulating the transmissions normally provided in connection with distance measuring equipments for further providing information of telemetric significance.

In distance measuring equipments which operate on the principle of measuring travel time of pulses of electromagnetic energy to a reflecting object and back to the source of energy, the precise timing of the transmitted pulses has not normally been a matter of importance, since only the elapsed time between transmissions and receptions has had significance in determining range or distance. In systems wherein a large number of distance measuring equipments of the pulsed type have operated on the same frequency and in a relatively restricted area, it has in fact been the conventional practice to transmit from each of the equipments at random, to avoid or minimize the possibility of interference between the separate equipments.

At the present time a type of distance measuring system which has received the approval of the Civil Aeronautics Authority, for determining the distance of aircraft from a transponder or repeater station located at an airport or other fixed location, provides for the transmission from each of a plurality of aircraft of pulses at random times and with random spacings, both with respect to the transmissions from any one aircraft, and with respect to the transmissions from the various aircraft considered as a group. The reason for the random character of the transmissions is, as hereinbefore has been indicated, to avoid or to minimize the possibility of interference between measuring equipments, all of which receive signals from the same transponder. The receiver of each of the distance measuring equipments is gated to enable reception of pulses only during times after pulse transmissions which correspond to the range which the equipment is momentarily measuring. By causing the average time between transmitted pulses in a given equipment to be large relatively to the time the receiver of that equipment is gated open, the majority of pulses transmitted from adjacent equipments, are not effective with respect to the given equipment, and those which do escape past the time gate, due to their random occurrence, have negligible effect on the range measurement.

It is my conception that the times or time positions of transmission of pulses emitted by the pulse type distance measuring equipment above briefly described, may be controlled in accordance with the value of a measurable quantity, without destroying, or, in fact, affecting in any way, the advantages and mode of performance of the distance measuring equipment. The time positions of the emitted pulses from any desired number of pulse transmitters may be translated at an indicating or recording station, remote from the several pulse transmitters, in terms of the values of the measurable quantity, providing at the station continuous indications, in transient or permanent form, of the values of the quantity.

More specifically, I desire to apply my invention to the transmission of altitude information from a plurality of aircraft, by means of time position modulation of the pulses which are transmitted by the craft in the process of obtaining distance measurements.

In order to make effective application of a system of pulse timing modulation for telemetric purposes, a reference time must be provided, as well as a reference time scale, which are common to the entire system, so that the time positions of pulses transmitted by various transmitters to represent various telemetric values, shall be translatable or interpretable in terms of a common reference time and time scale. Since it is expected that substantially all airports will, in the course of time, and in accordance with the requirements of the Civil Aeronautics Authority, be provided with omni-directional beacon systems, and since such systems provide transmissions at a fixed frequency and at a constant phase, I prefer to utilize these transmissions to provide the required time scale, as well as the required zeros of time. It will be understood, however, that such utilization of transmissions which are in any event available, involves merely a matter of convenience, and that a time scale and zero time references for the system of the invention may be provided in other ways.

I have discussed hereinbefore the concept of impressed time position modulations on pulses which are transmitted in any event for the purpose of making distance measurements. The function of translating or interpreting the modulated pulses may be accomplished by means of a line scanning recorder, of the type now quite common and well known in connection with facsimile recording, and having a helical platen which scans, by virtue of a rotary motion imparted thereto, laterally of a time-fed record receiving surface, in synchronism with the pulse transmissions, each possible time position of the transmitted pulses bearing a definite and invariable correspondence with a recording position on a line extending laterally across the record receiving surface.

Accordingly, it is an object of the present invention to provide a telemetric system of the type utilizing pulse time modulation.

It is a further object of the invention to provide an improved pulse type distance measuring apparatus, wherein the time positions of pulses otherwise transmitted for the purpose of measuring distance, provide a measure of the value of a variable quantity.

It is a further object of the invention to provide a telemetric system utilizing pulses otherwise provided for the purpose of measuring distance, by timing the transmitted pulses in accordance with the value of the quantity measured.

It is, more specifically, an object of the present invention to transmit continuously, information concerning the altitudes of a plurality of elevated objects, such as aircraft, by modulating the time positions of pulses otherwise transmitted from the aircraft for purposes of measuring range or distance.

More broadly stated it is an object of the invention to increase the usefulness of pulse type distance measuring equipments by assigning significance to the timing of the transmitted pulses.

It is another object of the invention to provide a recorder for recording telemetric values by interpretation of the time positions of pulses otherwise transmitted for the purpose of measuring distance.

The above and still further objects and advantages of the invention will become apparent upon study of the following detailed description of a specific embodiment thereof, especially when taken in conjunction with the accompanying drawings, wherein:

Figure 1 is a functional block diagram of an interrogator-responsor, or pulse transmitter and receiver, adapted for measuring distance, and modified in accordance with the present invention, and a functional block diagram of a telemetric recording station, in accordance with the invention; and Figure 2 is a plan view of a record created in accordance with the invention.

Referring now more specifically to the drawings, the reference numeral 1 denotes a radio transmitter, which operates at any convenient and constant frequency, say 150 mc., for purposes of example. The transmitter 1 is associated with a pulser 2, which serves to energize the transmitter 1 to transmit short pulses or bursts of radio frequency energy in response to each control pulse applied to the pulser. Control pulses for the pulser 2 are developed by means of an equipment of the type disclosed in the aforementioned U. S. Patent, No. 2,505,314, and comprises an altimeter 3 of the aneroid cell type which serves to position an angularly positionable pointer 4, about a pivot point 5, causing the pointer 4 to assume an angular position corresponding with and determined by the altitude measured by the altimeter 3. Secured to the pointer 4 in any convenient fashion is a small permanent magnet 6. A synchronous motor 7 drives a shaft 8, which is aligned with the pivot point 5, and to which is secured an arm 8a having at one end a pick-up coil 9, which is rotated as the shaft 8 and arm 8a turn, in a path immediately adjacent the locus of possible positions of the magnet 6. Upon each passage of the pick-up coil 9 past the magnet 6 there is induced in the coil 9 a voltage. This voltage is conveyed by means of leads 10 from the coil 9 to a pair of slip rings 11 secured to the shaft 8, and thence to a pair of brushes 12, leads from which extend to the pulser 2, and apply to the pulser 2 for control purposes the voltages induced in the coil 9.

The equipment and apparatus described in the preceding two paragraphs may be briefly described as an altitude timed pulse transmitter, and will be so referred to hereinafter, since its function is to provide pulses or brief bursts of radio frequency energy at times, with respect to an arbitrary time scale determined and defined by the rotation of the synchronous motor 7, which depend upon the reading of an aneroid cell altimeter 3 and hence upon altitude.

We may assume that a plurality of the altitude timed pulse transmitters hereinbefore described are mounted each in a different aircraft, and that the synchronous motors 7 aboard all the aircraft are constrained to operate at a precisely common frequency, and with a precisely common phase or framing, by means which will be described in detail hereinafter. Under such conditions the various aircraft will transmit periodic pulses, all at a common repetition rate, and all timed with respect to the same arbitrary zero of time and with respect to the same time scale, but the pulse transmissions from each of the aircraft having time positions, or phases, which are determined by the instantaneous altitude of the aircraft.

There has been discussed hereinbefore quite briefly the theory of operation of the pulse transmission type of distance measuring equipment, wherein pulses are transmitted at random from a transmitter aboard each of a plurality of aircraft, and are repeated from a common transponder T located at a ground station, usually at a significant location such as an airport or an aircraft carrier, and wherein the time required for transmission of the pulses to the transponder and back to a receiver associated with the transmitter is measured to determine range. It has been explained that the random character of the transmitted pulses is enforced for the purpose of minimizing interferences between aircraft which are transmitting and receiving contemporaneously. While this random operation of the distance measuring equipment has been considered essential heretofore, it is rather non-simultaneous transmissions which are essential, and these may be provided as among a plurality of transmitters by what may be described as an ordered randomness, as distinguishable from a purely chance randomness, without loss of any of the benefits of the latter.

More specifically I propose to utilize the transmitter 1 as the interrogator of a pulse type of distance measuring equipment, which is in essence merely an interrogator-responsor. Thereby each aircraft is constrained to transmit pulses at the same repetition rate, but at time positions corresponding with altitude, so that aircraft flying at even slightly distinct and different altitudes are incapable of simultaneous transmissions. An ordered randomness is introduced into the transmissions of the interrogators of the distance measuring equipments which serves to prevent interference between transmissions from distinct aircraft with the same effectiveness as has been the case hitherto by transmission at chance random.

The control of pulse timing in the interrogators of the present system in accordance with the value of a variable parameter, for example altitude, enables determination at remote stations of the values of said parameter as associated with each of the transmitting aircraft, and in accordance with the principles and apparatus disclosed in U. S. Patent #2,534,939, referred to supra, the values of said parameter may also be recorded in permanent form on a time fed and time calibrated record receiving surface or strip.

Disregarding for the immediate present the distance measuring functions of the airborne equipment of the present system, and turning our attention to the ground recording station, there is provided a pulse receiver 30, arranged to receive and demodulate pulse signals of the character of those transmitted by the airborne transmitters or interrogators of the system. Detected pulses provided by the receiver 30 are applied, after amplification, if required, to the marker electrode 31 of a facsimile type recorder 32, having a helical platen 33 and a time fed record receiving surface 34. The specific character and structure of the recorder 32 forms no part of the present invention, and I may utilize various recorders of the type indicated, such recorders being available for purchase commercially and having been the subject of the grant of a considerable number of Letters Patent of the United States. I specify, however, that a recorder of the type disclosed in U. S. Patent #2,215,806, issued to C. J. Young and dated September 24, 1940, is satisfactory for the purpose in hand, and make reference to that patent for a full and complete disclosure of a suitable recording mechanism. Suffice it to state in the present application, that marks are created on the surface 34 upon application to the marker 31 of a sufficient voltage, the lateral position of the mark being determined by the instantaneous position of the helical platen at the instant of application of the said voltage. The platen 33 of the recorder 32 is rotated by means of a synchronous motor 35 at the same speed and with the same framing phase as are the various synchronous motors 7, located at the telemetric transmitters of the system, and which cause rotation of pulse generating pick-up coils 9. In order to assure that the synchronous motor 35 and the various synchronous motors 5 shall be synchronized and identically framed, the motor 35 is utilized to control a synchronizing signal generator 36, which supplies its output to a radio transmitter 37 tuned to transmit on the frequency to which are tuned synchronizing signal receivers 20, located at the telemetric transmitting stations of the system. The specific structure and mode of operation of the sync signal generating equipment provided at the receiving and recording station of the present system forms no part of the invention, it being sufficient that signals be provided which are of suitable character to cooperate with the synchronizing and framing equipment at the various telemetric transmitters, to assure that the motors 7 will maintain precise framing and synchronization with respect to the motor 35. Many such synchronizing and framing systems are available in the prior art, and I do not desire to be restricted to any particular one of such systems. I have, however, specified one specific system which I prefer to employ, a full description of which, both in respect to structure and mode of operation, is to be found in Letters Patent of the United States, No. 2,263,641, to Nicolson.

A further signal which may be utilized for synchronizing in the present system, as has been briefly indicated hereinbefore, is the omni-directional beacon system of the type approved by the Civil Aeronautics Authority for installation generally at airports. This system operates by transmitting a rotating pattern of energy and a fixed pattern of omni-directional energy, the speed of rotation of the rotating pattern being related in frequency to a modulation frequency of 30 cycles per second, impressed on the omni-directional transmission. The 30 cycle signal provides a convenient synchronizing signal, and may be employed to drive all the synchronous motors 7 and 35 of the present system at identical speeds. Suitable framing signals may be superimposed on the 30 cycle modulation.

Suffice it to state that while various synchronizing and framing systems may be utilized in conjunction with the present system, as above indicated, I do not consider the use of any specific such system to be essential, and the various systems suggested are intended for purposes of exemplification only.

By virtue of the identical framing and rotative speed of the recorder motor 35 and of the telemetric transmitter motors 7, a common zero of time may be provided for all the equipments of the present system, and the coil supporting arms 8a as well as the helical platen 33 may so be arranged that upon passage of the coils 8a adjacent a meter position corresponding with zero value of the measured quantity, or of zero angular displacement of the meter pointer 4, the helical platen 33 shall be so phased as to be potentially able to create a mark on the record receiving surface 34 at a point corresponding with a zero calibration line antecedently provided on the surface. The record receiving surface may be calibrated laterally, by means of laterally spaced, parallel lines 35, provided thereon (See Figure 2) to enable determination of the value of any mark created on the paper. The total lateral dimension of the record receiving surface 34, or any predetermined portion thereof, may be caused to correspond with the total possible angular displacement of the pointer 4 of the aneroid cell and the total altitude range of the system.

It will be recalled that the transmitter 1 performs its primary function as an interrogator of an interrogator-responsor or distance measuring equipment. The responsor of the distance measuring equipment comprises a receiver 13 which is normally inoperative, but which is keyed to operative condition instantaneously in response to the output of a multivibrator or square wave generator 14, operation of which is initiated in response to each transmitted pulse, the square wave generator operating to provide a sensitizing or gain control voltage to the receiver 13 immediately upon application thereto of the control pulse derived from the pulser 2. The multivibrator is of the type, well known, per se, which maintains its condition, once it has been established, until a further control pulse is applied thereto, at which time it returns to its original position. In the present application the "off" pulse is applied to the multivibrator 14 from the receiver 13 itself, in response to a received or transponded pulse, and in the "off" position the sensitivity of the receiver is again reduced to a low value. It will thus be evident that the time gating is applied to the receiver 13, which is effectively switched on in response to each transmitted pulse and off in response to each received pulse, remaining thereafter in off position until the occurrence of a further transmitted pulse.

The time between successive pulses is chosen to be large in relation to the time of propagation of electromagnetic energy for the maximum intended range of the equipment, by a factor of the order of 100 to 1000, so that there is in effect a time sharing as between various aircraft of the system for range measuring purposes.

Range at any one aircraft may be measured in terms of the total operating time of the multivibrator 14, which in turn determines the average of certain currents or voltages of the multivibrator, in a manner which is well known per se, these currents or voltages being measurable by means of a voltmeter or ammeter 15 to determine range or distance.

The specific character of the distance measuring equipment utilized in my invention is per se well known, and is subject to modification in detail, in any event, and it is accordingly deemed unnecessary to complicate the description and illustration of the system with a full and complete circuit diagram and exposition thereof. I have accordingly disclosed and described same only to the extent required to enable those skilled in the art to understand the principles and mode of operation of my invention.

Since the various transmitted altitude representative signals of the present invention are indistinguishable, except in respect to magnitude, I have provided in circuit with the pulser 2, and between the pulser 2 and thhe pick-up coil 9, a time driven code keyer 22, which interrupts transmissions from each of the transmitters of the system at relatively long intervals, and in a coded sequence. By interrupting the control impulses applied to the pulser 2, transmissions from the transmitter 1 are likewise interrupted, as are thereby the altitude records at the ground station. By examining the coded interruptions of the records at the ground station each altitude record may be identified in terms of its originating aircraft.

Reference is made to Figure 2 of the drawings for an illustration of the appearance of a record as provided by the apparatus of the invention.

The arrow labelled "time" represents the longitudinal direction of feed of record receiving surface 34 with time, the lines 25 and 26 representing time records of aircraft altitude, and each of the records being interrupted at intervals in a coded sequence 27, to identify the record, or to relate same with a specific aircraft.

It will be realized that the transmitting equipments built in accordance with the present invention transmit atmospheric pressure, rather than time altitude, so that for a given time altitude transmissions from the various aircraft of the system may vary from day to day or from hour to hour, in accordance with the value of ambient pressure temporarily existing in a given area. To overcome this difficulty, the calibrations provided on the record receiving surface 34 may be provided under control of the value of local altitude existing on the ground. There is thereby provided an automatic correction for variations in local atmospheric pressure, since the value of each altitude record may be referred to a corrected calibration mark. Specifically, I provide at the ground station an altitude timed pulse generator 28, similar to that provided on the various aircraft of the system, for generating a control pulse timed, with respect to the arbitrary zero of time of the system, to correspond with sea level altitude for standard conditions of atmospheric pressure. The pulse generator 28 synchronizes a multiplying oscillator of the multivibrator type 29, which provides a number of output pulses, equally spaced, for each control pulse inserted therein. The pulses provided by the multi-vibrator are so spaced that when applied to the recorder 32, properly spaced calibration lines are recorded on the record receiving surface 34, the pulse frequency of the multi-vibrator 29 being fixed and the pulse separation being properly chosen for that purpose. The phasing or time positioning of the pulses are determined, however, by the pulse timing of the output of the control pulses 28, the latter being determined in part by local atmospheric conditions, the calibration lines varying in lateral position on the surface 34, all simultaneously, in accordance with such conditions. Examples of suitable calibration lines 35 are provided in Figure 3, variations from linearity of the lines 35 being occasioned by variations of atmospheric pressure, and the position of the lines with respect to the edges of the surface 34 being of significance primarily in determining the existence of such variations.

In accordance with the system of the present invention, all the aircraft as well as the ground station, may utilize aneroid altimeters pre-calibrated for standard atmospheric conditions, and proper and correct readings of altitude will be provided at various recording stations, or at the same recording station at various times, without introducing altitude corrections into the altimeter or the various aircraft.

While I have described one embodiment of my invention, it will be clear that variations and modifications thereof may be resorted to without departing from the true spirit and scope of the invention as defined in the appended claims.

What I claim and desire to secure by Letters Patent of the United States is:

1. In an airborne distance measuring equipment, a pulse transmitter, a pulse receiver having means for increasing and decreasing the gain thereof, means responsive to the transmission of a pulse by said transmitter for increasing the gain of said receiver, means responsive to reception of a pulse by said receiver for decreasing the gain of said receiver, and means responsive to the altitude of said transmitter for determining the time of pulse transmission with respect to an arbitrary zero of time.

2. The combination in accordance with claim 1 and further comprising a remote indicating means, and means responsive to said transmitted pulses at said remote indicating means for indicating the altitude of said transmitter.

3. The combination in accordance with claim 2 wherein said remote indicator comprises a line-scanning recorder for recording the times of occurrence of said transmitted pulses with respect to said arbitrary zero of time.

4. In combination, a distance measuring equipment comprising a pulse transmitter and a pulse receiver, a pulse generator for supplying distance measuring pulses for transmission by said transmitter, means for controlling the timing of pulses provided by said pulse generator comprising a device for measuring the value of a measurable quantity, said last mentioned device comprising a measuring instrument having a movable pointer, said means for controlling comprising apparatus for scanning the locus of possible positions of said pointer and for generating a control signal upon concurrence of said pointer position and of said scanning apparatus.

5. The combination in accordance with claim 4 and further comprising a remote line scanning recorder, and means for synchronizing the scanning actions of said recorder and of said apparatus, said recorder comprising marking means responsive to pulses transmitted by said pulse transmitter for creating a mark.

6. In combination, a distance measuring device located on an aircraft and comprising a pulse transmitter and a pulse receiver, means for timing the transmitted pulses with respect to arbitrary zeros of time in accordance with local atmospheric pressure as measured at said aircraft, a remotely located line scanning recorder having a line scanning marker responsive to electrical signals and a time-fed record receiving surface, means for receiving said transmitted pulses and for applying electrical signals to said marker in response thereto, means for initiating each scanning action of said marker at one of said arbitrary zeros of time and for extending the scanning action over time periods less than the maximum range of times between said transmitted pulses, and means responsive to local atmospheric pressure at said recorder for applying calibration signals to said line scanning marker at times corresponding with predetermined altitude values.

7. A distance measuring system comprising a plurality of pulse transmitters each aboard a different aircraft, a plurality of pulse receivers each operatively associated with one of said transmitters, a single pulse repeater responsive to all of said pulse transmitters for repeating pulse signals to said pulse receivers, a source of omni-directionally transmitted synchronizing signals, means for measuring altitude aboard said aircraft, and means for controlling the timing of the transmitted pulses from each of said pulse transmitters, within periodic time intervals defined by said synchronizing signals and common to all of said pulse transmitters, in accordance with altitudes of the transmitters as measured by said means for measuring.

8. A distance measuring system, comprising, a pulse transmitter aboard an aircraft, a pulse receiver aboard said aircraft, means for repeating to said receiver, from a remote location, pulses originating in said transmitter, after a time interval representative of distance of said aircraft from said remote location, means aboard said aircraft for measuring its altitude, and means for predetermining times of pulse transmission from said transmitter in accordance with only the altitude of said aircraft as measured by said means for measuring.

9. A distance measuring system comprising a plurality of pulse transmitters each aboard a different aircraft, a plurality of pulse receivers each operatively associated with one of said plurality of pulse transmitters, means for repeating pulses transmitted from said pulse transmitters from a single ground location to said pulse receivers, means comprising an omni-directional transmitter for delimiting substantially simultaneously aboard all said aircraft successive periodic time intervals common to said plurality of pulse transmitters, means aboard each of said aircraft for measuring its altitude, and means for displacing the times of transmission of said pulse transmitted from each of said pulse transmitters within said periodic time intervals in response to the means for measuring altitude, and in accordance with the altitude of the transmitter.

10. The combination in accordance with claim 9 wherein is further provided a remote indicator comprising means for indicating the times of occurrence of said transmitted pulses with respect to said periodic time intervals, thereby to indicate the altitudes of said plurality of aircraft.

11. The combination in accordance with claim 9 wherein is further provided a remote recorder of the line scanning type, said recorder having means for scanning successive lines in synchronism with said successive time intervals, said remote recorder comprising means for creating a record in response to each of said transmitted pulses, thereby to provide a continuous record of altitudes of said plurality of aircraft.

12. A distance measuring system, comprising, a plurality of pulse transmitters each aboard an aircraft, a pulse receiver aboard each of said aircraft, means for measuring the magnitude of a measurable quantity aboard each of said aircraft, means for delimiting periodic time intervals aboard all said aircraft which are common to all said aircraft, means aboard each of said aircraft responsive to the means for measuring aboard that aircraft for timing pulses transmitted by the pulse transmitter aboard that aircraft within said periodic time intervals in accordance with the magnitude of said quantity, a common pulse repeater for repeating pulses transmitted by all said aircraft to said pulse receivers, means for conditioning each of said receivers to receive substantially only pulses occurring substantially within a time interval after transmission corresponding with the range of the receiver from said common pulse repeater, and means for measuring said time interval aboard each of said aircraft as a measure of the range of said aircraft from said repeater.

13. A distance measuring system, wherein a plurality of distance measuring equipments each comprises a pulse transmitter and a receiver of repeated pulses, wherein a single pulse repeater is provided for repeating pulses transmitted from all said transmitters to all said receivers, and wherein each of said receivers is gated to receive pulses substantially only at times within its own range from said pulse repeater, comprising, separate means coupled to each of said distance measuring equipments for measuring the magnitude of a predetermined quantity, and means responsive to each of said means for controlling the times of transmission of pulses, from the distance measuring equipment to which it is coupled, within the time interval common to all said distance measuring equipments.

14. In combination, a distance measuring device located on an aircraft and comprising a pulse transmitter and a pulse receiver, means for timing the transmitted pulses with respect to arbitrary zeros of time in accordance with altitude as measured at said aircraft, a remotely located line scanning recorder having a line scanning marker responsive to electrical signals and a time fed record receiving surface, means for receiving said transmitted pulses and for applying electrical signals to said marker in response thereto, means for initiating each scanning action of said marker at one of said arbitrary zeros of time and for extending the scanning action over time periods less than the maximum range of times between said transmitted pulses.

15. In combination, a distance measuring device located on an aircraft and comprising a pulse transmitter and a pulse receiver, means for timing the pulses transmitted by said pulse transmitter with respect to arbitrary zeros of time in accordance with altitude as measured at said aircraft, a remotely located line scanning indicator having a line scanning marker responsive to electrical signals and a mark receiving surface responsive to said marker, means for receiving said transmitted pulses and for applying electrical signals to said marker in response thereto, means for initiating each scanning action of said marker at one of said arbitrary zeros of time and for extending the scanning action over time periods less than the maximum times between said transmitted pulses.

MARCEL WALLACE.

REFERENCES CITED

The following references are of record in the file of this patent:

UNITED STATES PATENTS

| Number | Name | Date |
|---|---|---|
| 2,252,083 | Luck | Aug. 12, 1941 |
| 2,344,562 | Potter | Mar. 21, 1944 |
| 2,403,603 | Korn | July 9, 1946 |
| 2,403,562 | Smith | July 9, 1946 |
| 2,403,626 | Wolff | July 9, 1946 |
| 2,405,238 | Seeley | Aug. 6, 1946 |
| 2,407,287 | Labin | Sept. 10, 1946 |
| 2,419,525 | Alford | Apr. 29, 1947 |
| 2,421,106 | Wight et al. | May 27, 1947 |
| 2,422,295 | Eaton | June 17, 1947 |
| 2,430,283 | Epstein | Nov. 4, 1947 |
| 2,468,045 | Deloraine | Apr. 26, 1949 |
| 2,483,097 | McIlwain | Sept. 27, 1949 |
| 2,490,268 | Herbst | Dec. 6, 1949 |
| 2,492,120 | Smith | Dec. 20, 1949 |
| 2,499,941 | Benfer | Mar. 7, 1950 |
| 2,500,638 | Krauth | Mar. 14, 1950 |
| 2,513,282 | Busignies | July 4, 1950 |
| 2,517,540 | Busignies | Aug. 8, 1950 |
| 2,521,697 | Deloraine et al. | Sept. 12, 1950 |